United States Patent [19]

Lau et al.

[11] Patent Number: 5,893,162

[45] Date of Patent: Apr. 6, 1999

[54] METHOD AND APPARATUS FOR ALLOCATION AND MANAGEMENT OF SHARED MEMORY WITH DATA IN MEMORY STORED AS MULTIPLE LINKED LISTS

[75] Inventors: Joseph C. Lau, Shelton; Subhash C. Roy, Hamden, both of Conn.; Dirk L. M. Callaerts, Rotselaar; Ivo Edmond Nicole Vandeweerd, Hasselt, both of Belgium

[73] Assignee: TranSwitch Corp., Shelton, Conn.

[21] Appl. No.: 796,085

[22] Filed: Feb. 5, 1997

[51] Int. Cl.$^6$ .................................................. G06F 12/00
[52] U.S. Cl. ........................................... 711/153; 707/100
[58] Field of Search .................................. 370/232, 598; 711/207, 153; 707/100

[56] References Cited

U.S. PATENT DOCUMENTS

| 5,123,101 | 6/1992 | Sindhu | 711/207 |
| 5,390,175 | 2/1995 | Hiller et al. | 370/398 |
| 5,654,962 | 8/1997 | Rostouer et al. | 370/232 |

Primary Examiner—Tod R. Swann
Assistant Examiner—David Langjahr

Attorney, Agent, or Firm—David P. Gordon; David S. Jacobson; Thomas A. Gallagher

[57] ABSTRACT

Apparatus and methods for allocating shared memory utilizing linked lists are provided which are particularly useful in telecommunications applications such as ATM. A management RAM contained within a VLSI circuit is provided for controlling the flow of data into and out of a shared memory (data RAM), and stores information regarding a number of link lists and a free link list in the shared memory, and a block pointer to unused RAM locations. A head pointer, tail pointer, block counter and empty flag are stored for each data link list. The head and tail pointers each include a block pointer and a position counter. The block counter contains the number of blocks used in the particular queue. The empty flag indicates whether the queue is empty. The free link list includes a head pointer, a block counter, and an empty flag. Each memory page of the shared data RAM receiving the incoming data includes locations for storing data. The last location of the last page in a block of shared data RAM memory is preferably used to store a next-block pointer plus parity information. If there are no more blocks in the queue, that last location is set to all ones. An independent agent is utilized in the background to monitor the integrity of the link list structure. Using the methods and apparatus of the invention, four operations are defined for ATM cell management: cell write, cell read, queue clear, and link list monitoring.

33 Claims, 7 Drawing Sheets

BLOCK MEMORY ADDRESS

LAST PAGE IN MEMORY BLOCK 512

METHOD AND APPARATUS FOR ALLOCATION AND MANAGEMENT OF SHARED MEMORY WITH DATA IN MEMORY STORED AS MULTIPLE LINKED LISTS

This application is related to co-owned U.S. Ser. No. 08/650,910, filed May 17, 1996, now issued as U.S. Pat. No. 5,774,465, which is hereby incorporated by reference herein in its entirety.

BACKGROUND OF THE INVENTION

1. Field of the Invention

The present invention relates to memory management. More particularly, the present invention relates to apparatus and methods of managing a plurality of data queues stored in linked lists in a shared common memory. The invention has particular application to the use of a very large scale integrated circuit (VLSI) for the buffering of telecommunications information such as ATM data, although it is not limited thereto.

2. State of the Art

In high speed communication networks, the management of buffer resources is one mechanism of increasing network performance. One group of methods of managing buffer resources is known as sharing, where a single RAM is simultaneously utilized as a buffer by a plurality of different channels. Various sharing methods are known (see Velamuri, R. et al., "A Multi-Queue Flexible Buffer Manager Architecture", IEEE Document No. 0-7803-0917-0/93) and each has inherent advantages coupled with inherent disadvantages in terms of blocking probability, utilization, throughput, and delay. What is common to all sharing methods, however, is that a mechanism is required to direct data into appropriate locations in the RAM in a desired order so that the data can be retrieved from the RAM appropriately. One such mechanism which is well known is the use of link lists which are used to manage multiple queues sharing a common memory buffer. Typically, a link list comprises bytes of data, where each byte has at least one pointer (forward and/or backward) attached to it, thereby identifying the location of the next byte of data in the queue. The link list typically includes extensive initialization and self-check procedures which are carried out by a microprocessor on a non-real-time basis. Thus, the use of standard prior art link list structures to manage multiplex queues sharing a common memory is not readily adaptable for VLSI implementation, and is likewise not particularly suited to the handling of very high speed telecommunications information where processing and handling are dictated by the data rate of the real-time telecommunications signal.

SUMMARY OF THE INVENTION

It is therefore an object of the present invention to provide an apparatus and method for control of memory allocation.

It is another object of the invention to provide a new link list structure for managing queues in a shared memory.

It is a further object of the invention to provide a single VLSI which utilizes a link list structure for managing queues of high speed real time data in a shared memory.

It is an additional object of the invention to provide a link list apparatus and method for controlling the flow of Asynchronous Transfer Mode (ATM) telecommunications data into and out of a shared buffer.

Another object of the invention is to provide an apparatus and method for VLSI control of ATM data into and out of a shared RAM by utilizing a separate RAM containing information related to the plurality of link lists in the shared RAM.

In accord with the objects of the invention a management RAM contained within a VLSI is provided for controlling the flow of data into and out of a shared memory (data RAM). The management RAM is preferably structured as an x by y bit RAM which stores information regarding y-2 data link lists in the shared RAM, a free link list in the shared RAM, and a block pointer to unused shared RAM locations. Information stored in the x bits for each data link list includes a head pointer, a tail pointer, a block counter and an empty flag. In a preferred embodiment particularly applicable to the control of ATM data, the head and tail pointers are each composed of a block pointer and a position counter, with the position counter indicating a specific page in a block which is made up of a set of contiguous pages of memory, and the block pointer pointing to the block number. Regardless of how constituted, the head pointer contains the address of the first word of the first memory page of the link list, and the tail pointer preferably contains the address of the first word of the last memory page in the link list. The block counter contains the number of blocks used in the particular queue, and has a non-zero value if at least one page is used in the queue. The empty flag indicates whether the queue is empty such that the content of the link list should be ignored if the queue-empty flag indicates that the queue is empty.

Information stored in the management RAM for the free link list includes a head pointer, a block counter, and an empty flag, but does not need to include a tail pointer as free blocks are added to the top of the free list according to the preferred embodiment of the invention. As is discussed below in more detail, as data from different channels is directed into blocks of the data RAM, a link list is kept for each channel. As data is read out of the data RAM, blocks become available to receive new data. It is these freed blocks which are added to the free list. Block space can be assigned from the free list before or after the unused blocks (discussed below) are used.

To avoid excessive initialization requirements, an unused-block pointer is provided in the management RAM, as discussed above, and provides a pointer to the next unused block in memory. Initially all link lists, including the free list, are empty, and the unused block pointer is set to the number of blocks in the memory. As data is written to a block of shared RAM memory, the unused block pointer is decremented. When the unused block pointer equals zero, all of the cell blocks are included in the link lists (including the free link list).

According to a preferred aspect of the invention, each memory page of the shared data RAM receiving the incoming data (which RAM is managed by the management RAM) is composed of M contiguous memory addresses. Depending on the memory type, each address location can be of size B bits. The most common sizes are eight bits (byte), sixteen bits (word), thirty-two bits, and sixty-four bits. The first M-1 locations in the page are used to store data. The last (M'th) location of the last page in the block preferably is used to store the address of the first location of the next block of the queue plus an odd parity bit; i.e., the M'th location of the last page in the block stores a next block pointer plus parity information. If there are no more blocks in the queue, the M'th location in the last page is set to all ones.

According to another aspect of the invention, an independent agent is utilized in the background to monitor the integrity of the link list structure. The independent agent monitors the sum of the count of all of the link list block counters plus the unused blocks to ensure that it equals the total number of memory blocks in the common RAM. If not, an error is declared. Likewise, the independent agent checks each link list stored in the management RAM for the following error conditions: head and tail pointers are equal and the block counter is not of value one; head and tail pointers are different and the block counter is one; and, block counter equals zero. If desired, the independent agent can also monitor the block pointers stored in the M'th location of the last page of each block to determine parity errors and/or to determine errors using parity or CRC.

Using the methods and apparatus of the invention, four operations are defined for ATM cell management: cell write, cell read, queue clear, and link list monitoring. In the cell write operation, a cell is stored into a queue. More particularly, when an ATM cell is received at a port w so that it is to be stored in queue number n (which stores cells of priority v for port w), a determination is first made as to whether the queue is empty. If it is not empty, the queue status (i.e., the tail pointer and position counter stored in management RAM) is obtained, and a determination is made as to whether a new block will be needed to be added to the queue. If a new block is not required, the cell is written to the location indicated by the tail pointer position, and the tail pointer position counter for that queue in the management RAM is updated. If this is the last page of a block, the M'th location of the page (in the shared memory) is set to all ones. If a new block is required, either because the queue was empty or because a previous cell had been written into the last page of a block, a block must be obtained. If it is a first block of a queue, initial queue parameters are stored. If it is not the first block of the link list, a block is obtained from the free list and the free list is updated; or the block is obtained from the unused blocks and the block pointer for the unused blocks is updated. Then, the cell is written to the queue, and the tail pointer, position counter, and block counter for the queue are all updated in the management RAM.

The cell read operation is utilized where a cell is to be read from a queue. In the cell read operation, the cell indicated by the head pointer and head pointer position counter for that queue is read from the queue. After reading the cell from the queue a determination is made as to whether the cell was either the last cell in a block and/or the last cell in the queue. If it is neither, then the queue status is updated (i.e., the head pointer position counter is changed), and another cell read operation is awaited. If the cell is the last cell in the block, then the queue status preferably is checked for correctness by verifying the parity of the pointer (using a parity bit), and is updated by changing the head pointer and head pointer position counter. The free list is updated by adding the freed block to the head of the free list, and the free list and link list block counters are updated. If the cell is the last cell in the queue, the procedure for the last cell in the block is followed, and the queue empty flag is set.

The queue clear operation is a microprocessor command provided for the purpose of clearing a queue. When the queue clear operation is presented, the queue status is updated by setting the queue flag, and the blocks in the queue are added to the head of the free list which is likewise updated.

The link list monitoring operation is the agent which monitors the integrity of the link list structure whenever the cell write, cell read, and queue clear operations are not running. As set forth above, the link list monitoring operation monitors the linked lists for errors by checking that the sum of the count of all of the link list block counters plus the unused blocks equals the total number of memory blocks in the common RAM, that when head and tail pointers are equal the block counter is set to one, that when head and tail pointers are different the block counter is not set to one, etc.

Additional objects and advantages of the invention will become apparent to those skilled in the art upon reference to the detailed description taken in conjunction with the provided figures.

BRIEF DESCRIPTION OF THE DRAWINGS

FIG. 3b is a diagram of the details of a page of one of the blocks shown in FIG. 3a.

FIG. 3c is a diagram of an example of the information contained in the memory management RAM of FIG. 1 for managing the shared data memory example of FIG. 3a.

DETAILED DESCRIPTION OF THE PREFERRED EMBODIMENTS

Figure 1:
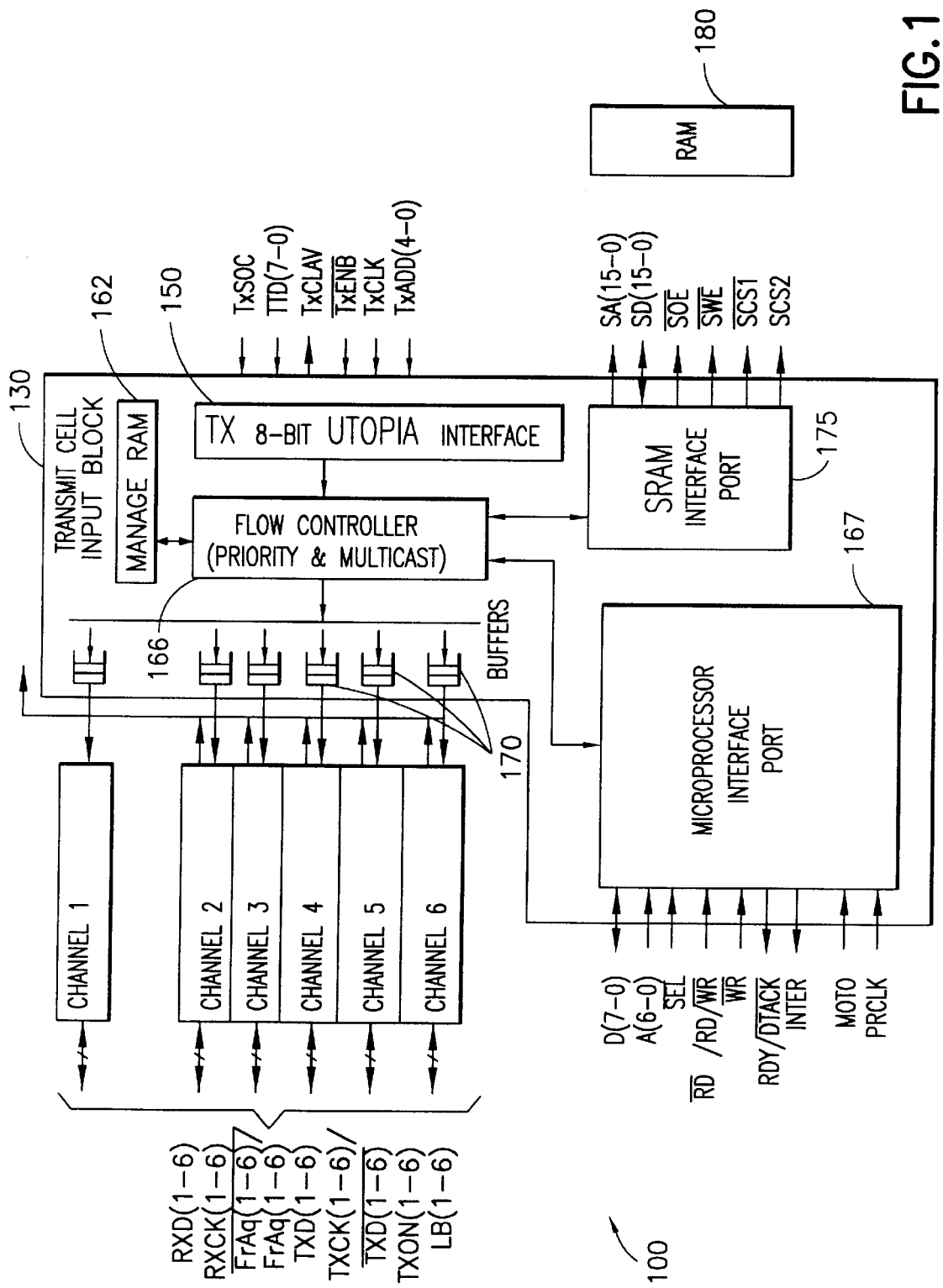
FIG. 1 is a block diagram of an apparatus incorporating the link list memory management RAM of the invention.

The invention will now be described with reference to the physical layer VLSI portion of an ATM destination switch described in parent U.S. Ser. No. 08/650,910, although it is not limited thereto. As seen in FIG. 1, and as discussed in the parent application, the physical layer portion 130 of the ATM destination switch 100 preferably includes a UTOPIA interface 150, a managing RAM 162, a flow controller 166, a microprocessor interface 167, channel interface buffers 170, and a RAM interface 175. The flow controller 166 is coupled to the UTOPIA interface 160, the managing RAM 162, the microprocessor interface 167, the channel interface buffers 170, and the RAM interface 175. The UTOPIA interface generally receives cells of ATM data in a byte-wide format, and passes them to the flow controller 166. Based on the destination of the cell (as discussed in the parent application), and the priority of the cell, the flow controller 166 writes the cell into an appropriate output buffer 170. The output buffer is preferably capable of storing at least two ATM cells so that one cell can be read out of the buffer as another is being read into the buffer without conflict. If buffer space is not available for a particular cell at a particular time, the flow controller 166 forwards the ATM cell via the RAM interface 175 to a desired location in a shared RAM 180 (which may be on or off chip) based on information contained in the managing RAM 162 as discussed in more detail below. When room becomes available in the output buffer 170 for the cell, the flow controller 166 reads the data out of the shared RAM 180, and places it in the buffer 170. In the background, when not receiving data from the UTOPIA interface, and when not reading data from or writing data to the shared RAM 180 or writing data to the buffers, the flow controller 166 monitors the integrity of the link list structure contained in the managing RAM, as is described in more detail below. In addition, the flow controller 166 can perform various functions in response to microprocessor command received via the microprocessor interface 167.

Figure 2:
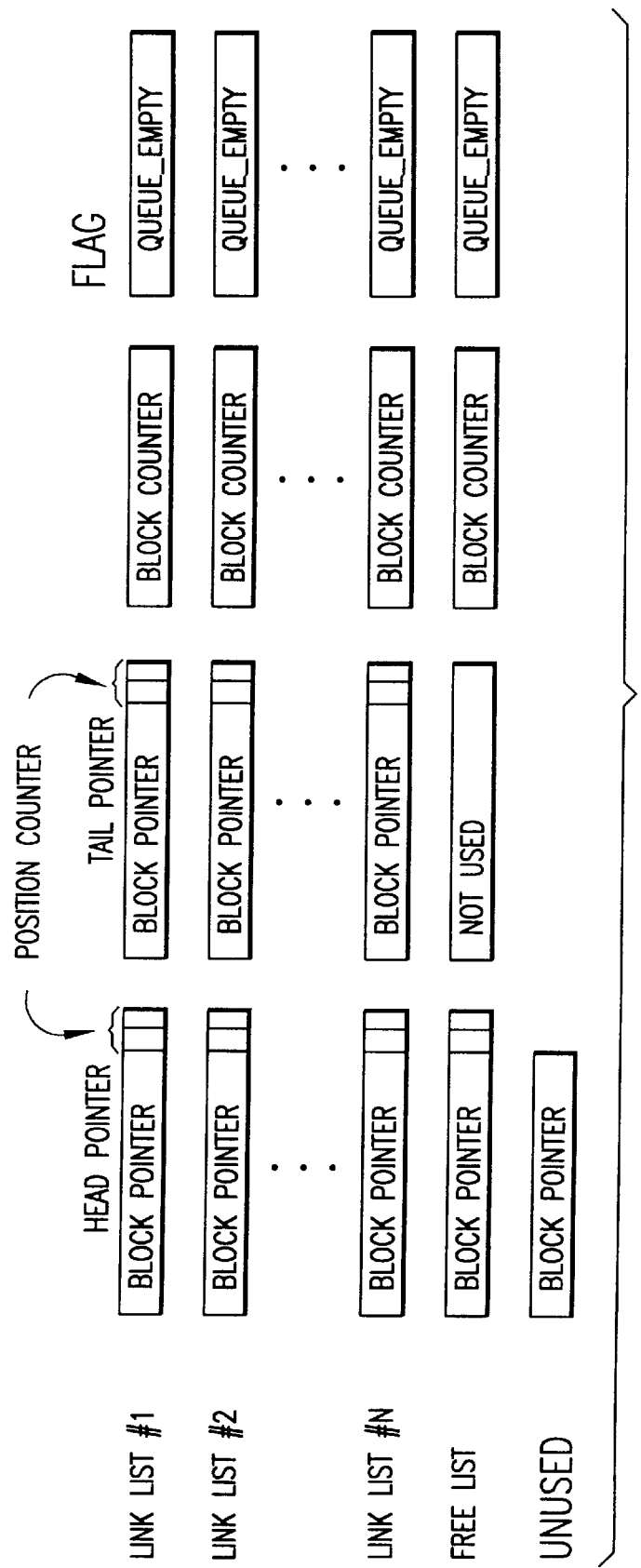
FIG. 2 is a chart showing the structure of the memory management RAM of FIG. 1.

The managing RAM 162 may serve various functions, including providing information for assisting in the processing of the header of the ATM cell as discussed in the parent application hereto. For purposes of this invention, however, the managing RAM 162, or at least a portion thereof, is preferably provided as a x bit by y word RAM for the purpose of managing y-2 link lists which are set up in the shared RAM 180 (y-2 equalling the product of w ports times v priorities). Thus, as seen in FIG. 2, a link list information structure for y-2 data queues includes: a head pointer, a tail pointer, a block counter, and a queue empty flag for each of the y-2 data queues; a free list block pointer, block counter, and queue empty flag for a free list; and a block pointer for the unused blocks of memory. Each head pointer and tail pointer preferably includes a block pointer and a position counter, with the block pointer used for pointing to a block in the memory, and the position counter being used to track pages within a block of memory. Thus, for example, where ATM cells of fifty-three bytes of data are to be stored in the shared memory, and each cell is to be stored on a "page", a block having four contiguous pages may be arranged with the position counter being a two bit counter for referencing the page of a block. The block counter for each queue is used to reference the number of blocks contained within the queue. The queue empty flag when set indicates that the queue is empty, and that the pointers contained within the queue as well as the block count can be ignored.

As suggested above, the head pointer for each link list queue contains the address of the first word of the first memory page of the queue in the shared memory. The tail pointer for each link list queue contains the address of the first word of the last memory page in the queue. Each memory page of the shared memory is composed of M contiguous memory addresses. Depending on the memory type, each address location can be of size B bits, with common sizes being eight bits (byte), sixteen bits (word), thirty-two bits, or sixty-four bits. In accord with the preferred embodiment of the invention, the address locations are sixteen bits in length with the first M-1 locations in a page containing the stored information. The M'th location of a last page in a block is used to store a next block pointer which is set to the first location of the next block plus an odd parity bit. Where the block is the last block in the queue, the Math location of the last page in the last block is set to all ones. Where the page is neither the last page of the block, nor the last block in the queue, the M'th location of the page is not utilized. In the preferred embodiment of the invention used with respect to ATM telecommunications data, each page is thirty-two words in length (i.e., M=32), with each word being sixteen bits. Thus, an ATM cell of fifty-three bytes can be stored on a single page with room to spare. It should be appreciated, that in some applications, only the data payload portion of the ATM cell (i.e., forty-eight bytes), and not the overhead portion (five bytes) will be stored in the shared memory. In other applications, such as in switches where routing information is added, cells of more than fifty-three bytes may be stored. Regardless, with a thirty-two word page, system addressing is simplified.

Figure 3A:
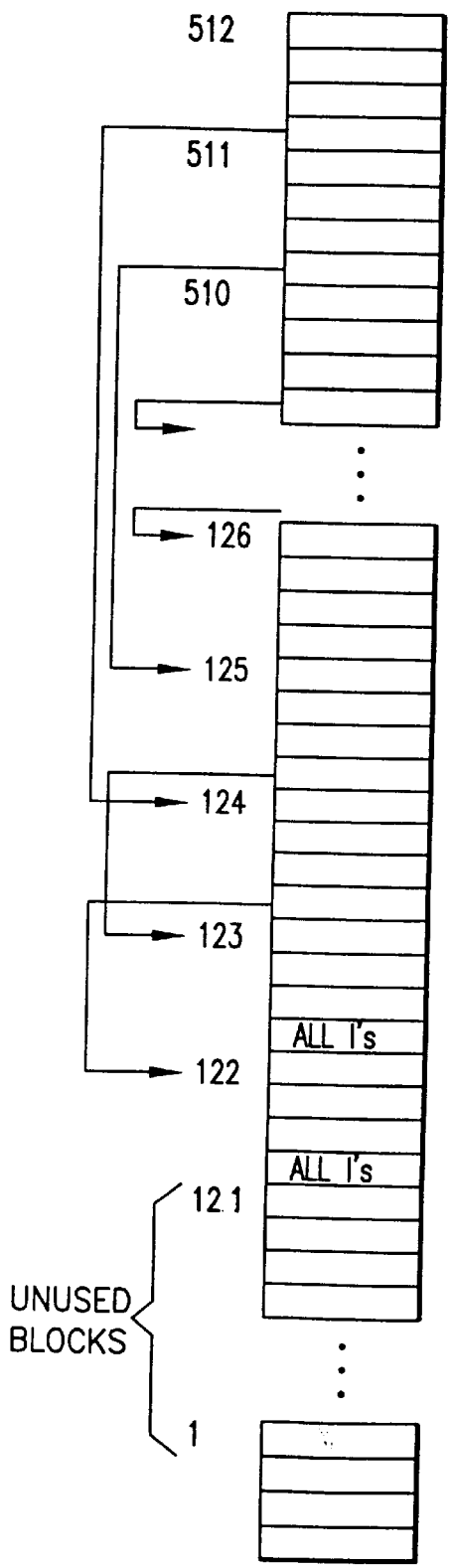
FIG. 3a is a diagram of an example of the shared data memory of the apparatus of FIG. 1.
Figure 3B:
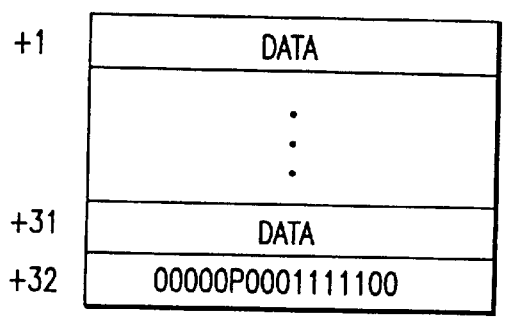

An example of the memory organization of the shared memory is seen in FIG. 3a. In FIG. 3a, two active link list data queues are represented, as well as a free list queue and an Unused block. In particular, memory blocks 512, 124, and 122 are shown linked together for a first queue, memory blocks 511, 125, and 123 are linked together for a second queue, memory blocks 510–125 are linked together for the free list queue, and memory blocks 121–1 are Unused. It will be appreciated that in the preferred embodiment of the invention, each page contains thirty-two sixteen bit words. Thus, the thirty-second (M'th) word of memory block 512 (seen in more detail in FIG. 3b) contains a pointer (the ten least significant bits) which points to memory block 124, the thirty-second word of memory block 124 contains a pointer which points to memory block 122, and the thirty-second word of memory block 122 contains all ones, thereby indicating the last word in the queue. Likewise, the thirty-second word of memory block 511 contains a pointer which points to memory block 125, the thirty-second word of memory block 125 contains a pointer which points to memory block 123, and the thirty-second word of memory block 123 contains all ones, thereby indicating the last word of that queue.

The free list of FIG. 3a is seen extending from block 510 to block 126. The unused blocks run from block 121 to block 1.

Figure 3C:
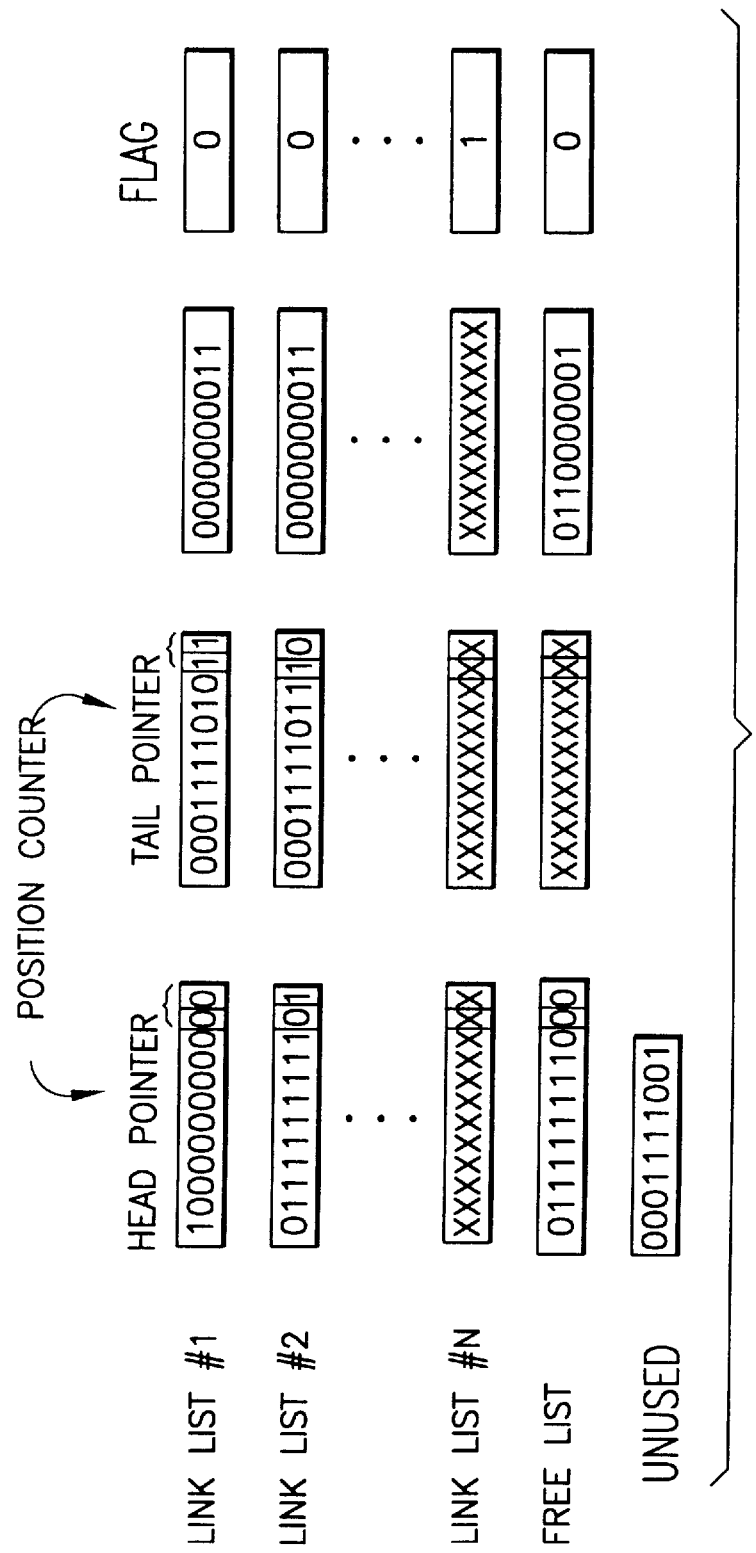

Turning to FIG. 3c, specifics are seen of the management RAM which would be associated with managing the shared memory in the state of FIG. 3a. In particular, information for link list #1 is seen with a head pointer having a block pointer having a value equal to 512 and a position counter set at "00" to indicate a first page of memory in the block storing data. The tail pointer of the link list #1 information has a block pointer having a value equal to 122 and a position counter set to "11" to indicate that all pages of block 122 are being used. The block counter of the information for link list #1 is set to a value of three, and the queue empty flag is not set (i.e., equals zero). Information for link list #2 is seen with a head pointer having a block pointer having a value equal to 511 and a position counter set at "01" to indicate that the data first occurs at a second page of the block (i.e., the first page already having been read from the block). The tail pointer of the link list #2 information has a block pointer having a value equal to 123 and a position counter set at "10" which indicates that there is no data in the last page of the block. The block counter of the link list #2 information is also set to a value of three, and the queue empty flag is not set. The value of the head and tail pointers and block count for the information of link list #N are not indicated, as the queue empty flag of link list #N is set (equals one), thereby indicating that the pointers and block counter do not store valid data. Likewise, while details of information for other link lists are not shown, the only data of interest would be that the queue empty flags related to all of those link lists would equal one to indicate that no valid data is being stored with reference to those link lists. The head pointer of the free list information has a block pointer set to a value 510, and a block count of 385. The queue empty flag of the free list is not set, as the free list contains data. Finally, the block pointer relating to the Unused queue is shown set to a value of 121. It is noted that in order to increase performance, the free list head pointer and block counter information is preferably implemented in a series of flip-flops, and is thus readily available for purposes discussed below with reference to FIGS. 4a–4d. The queue empty flags are also preferably similarly implemented.

It should be appreciated that by providing the queue empty flags and an Unused block pointer, excessive initialization requirements are eliminated. As suggested above, the queue empty flag indicates that there is no valid data for a link list and that the head and tail pointers for that link list and the block counter of that link list can be ignored. The Unused block pointer is provided to point to the next unused block in shared memory. As memory pages are written or used, the Unused block pointer is decremented until a value of zero is reached. At that point, all cell blocks are included in the link lists (including the free list). As previously mentioned, when a block is read from the shared memory, the available block is added to the free list. When a new block is required for adding to a link list, the block space may be taken from either the free list or from the Unused blocks, and available blocks from the free list may be taken either before or after the Unused blocks are used.

Figure 4A:
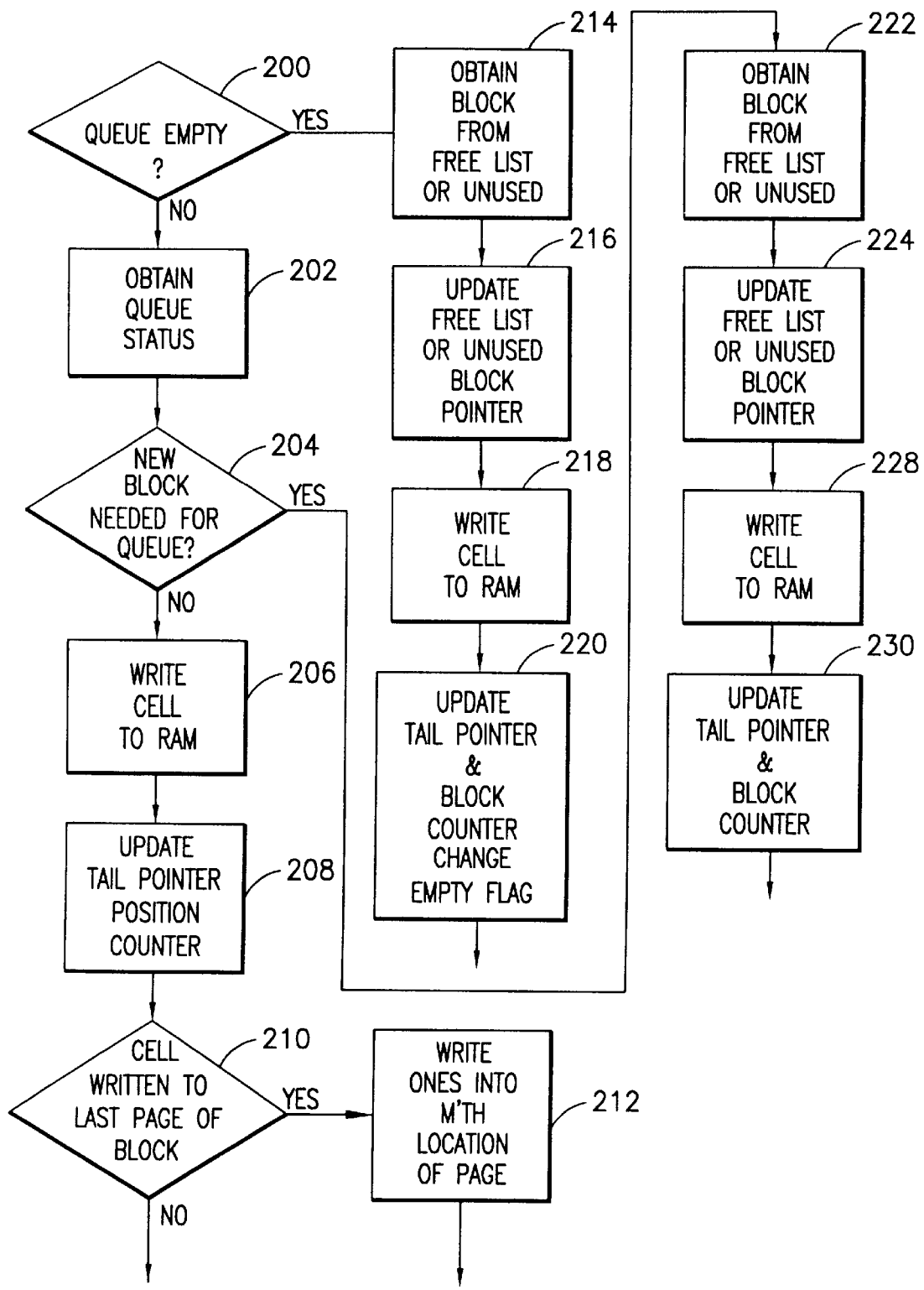
FIGS. 4a–4d are flow charts for the write, read, queue clear, and link list monitoring operations carried out by the flow controller of the apparatus of FIG. 1.

Turning now to FIG. 4a, a flow chart of operations of the flow controller 166 of the apparatus 100 of FIG. 1 is seen with respect to writing data to the shared memory. It is noted that while the operations are shown in flow chart form, in accord with the preferred embodiment of the invention, the operations are carried out in hardware. When the flow controller 166 determines that it is receiving an ATM cell which cannot be written into a buffer directly, the flow controller makes a determination at 200 (by checking the management RAM queue empty flag associated with that queue) as to whether the queue which should receive that cell is empty. If the queue is not empty, at 202 the queue status (i.e., the tail pointer and position counter) for that queue is obtained, and at 204 a determination is made as to whether a new block will be needed to be added to the queue (i.e., is the position counter equal to "11"). If a new block is not required, at 206 the cell is written to the shared RAM location indicated by the tail pointer position counter for that queue (stored in management RAM), and at 208 the tail pointer position counter for that queue is updated. At 210, a determination is made as to whether the cell is being written into the last page of a block. If so, at 212 the flow controller writes a word of all ones into the M'th location of the page (in the shared memory).

If it is determined that a new block of shared RAM is required to store the incoming cell because at 200 the queue was empty, at 214, a block is obtained from the either the free list or from unused RAM. If the block is obtained from the free list, at 216, the free list information is updated by changing the head pointer of the free list (i.e., setting the head pointer to the value stored in the M'th location of the last page of the obtained block), and by decrementing the block counter associated with the free list. If the block is obtained from the unused RAM, the block pointer for the unused RAM is decremented at 216. Regardless, at 218, the cell is written to the queue, and at 220, the tail pointer and block counter for the queue are both updated in the management RAM (with the block counter being set to the value one), and the queue empty flag is changed.

If it is determined that a new block of shared RAM is required to store the incoming cell because at 204 the tail pointer position counter of the link list indicated that the entire tail block is storing data, at 222, a block is obtained from the either the free list or from unused RAM. If the block is obtained from the free list, at 224, the free list is updated by changing the head pointer of the free list (i.e., setting the head pointer to the value stored in the M'th location of the last page of the obtained block), and by decrementing the block counter associated with the free list. If the free list becomes empty because a block is removed, the queue empty flag of the free list is set. If the block is obtained from the unused RAM, the block pointer for the unused RAM is decremented at 224. Regardless, at 228, the cell is written to the queue, and at 230, the tail pointer and block counter for the queue are both updated in the management RAM.

Figure 4B:
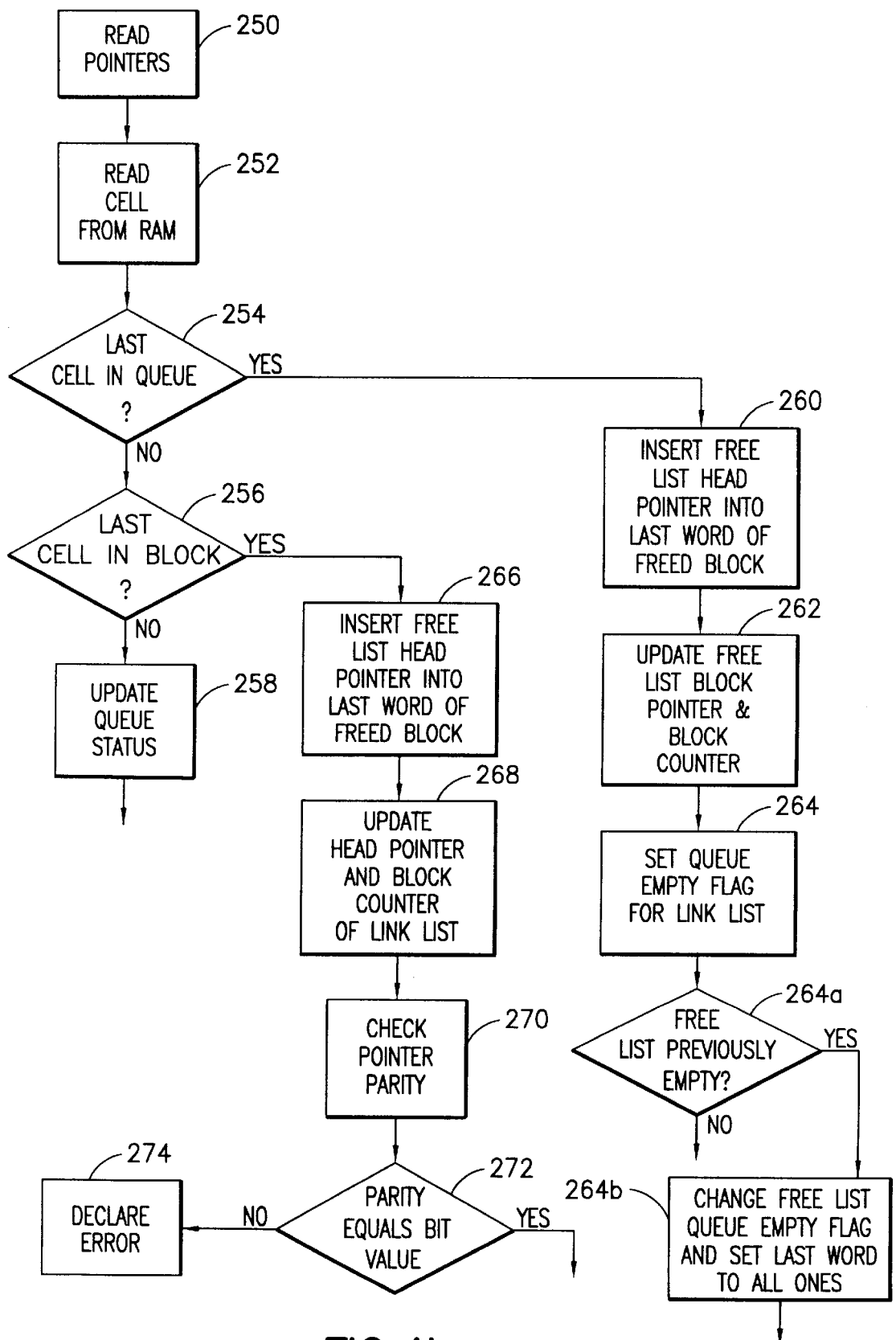

The details of the flow controller operation with respect to a cell read operation (i.e., where a cell is to be read from a queue because a buffer is available to receive the cell) is seen in FIG. 4b. In particular, when a data buffer becomes available, the flow controller at 250 reads the head pointer and tail pointer in the management RAM for the link list associated with the available data buffer. Then, at 252, the flow controller reads from shared memory the cell at the location in the shared memory indicated by the head pointer, and provides the cell to the data buffer. After the data has been read, the flow controller determines at 254 (based on the head pointer and tail pointer) whether the cell was the last cell in the queue, and at 256 (based on the head pointer position counter) whether the cell was the last cell in a block. If it is neither, then at 258 the queue status is updated (i.e., the head pointer position counter is changed), and another cell read operation is awaited. If at 254 it is determined that the cell is the last cell in the queue, at 260, the head pointer for the free list (obtained from the management RAM) is inserted into the last word of the last page of the freed block. Then at 262, the free list in the management RAM is updated by adding the freed block to the head of the free list; i.e., by updating the free list block pointer and block counter. At 264, the queue empty flag is set for the link list which now has no blocks. If the free list was empty prior to adding the freed block, the free list must be initialized (with appropriate head pointer and block counter) and the queue empty flag changed at 264. In addition, in the case were the free list was empty prior to adding the freed block, the last word in the freed block in the shared RAM should be set to all ones.

If at 256 it is determined that the cell which has been read out of shared memory is the last in a block, then at 266, the head pointer for the free list as obtained from the management RAM is inserted into the last word of the last page of the freed block. Then, at 268, the queue status for the link list is updated by changing the block pointer and position counter of the head pointer (to the value contained in the last word of the page of memory being read out of the shared memory), and by decrementing the block counter. Again, it is noted that if the free list was empty prior to adding the freed block, the free list must be initialized (with appropriate head pointer and block counter) and the queue empty flag changed, and the last word in the freed block in the shared RAM should be set to all ones. It is also noted, that upon obtaining the pointer in the M'th location of the last page of the block, according to the preferred embodiment of the invention, at 270, a parity check is done on the pointer. At 272, the calculated parity value is compared to the parity bit stored along with the pointer. Based on the comparison, at 274, a parity error condition can be declared, and sent as an interrupt message via the microprocessor interface port 167 (FIG. 1) to the microprocessor (not shown). Preferably, when a parity error is found, the microprocessor treats the situation as a catastrophic error and reinitializes the management and data RAMs.

Figures 4C, 4D:
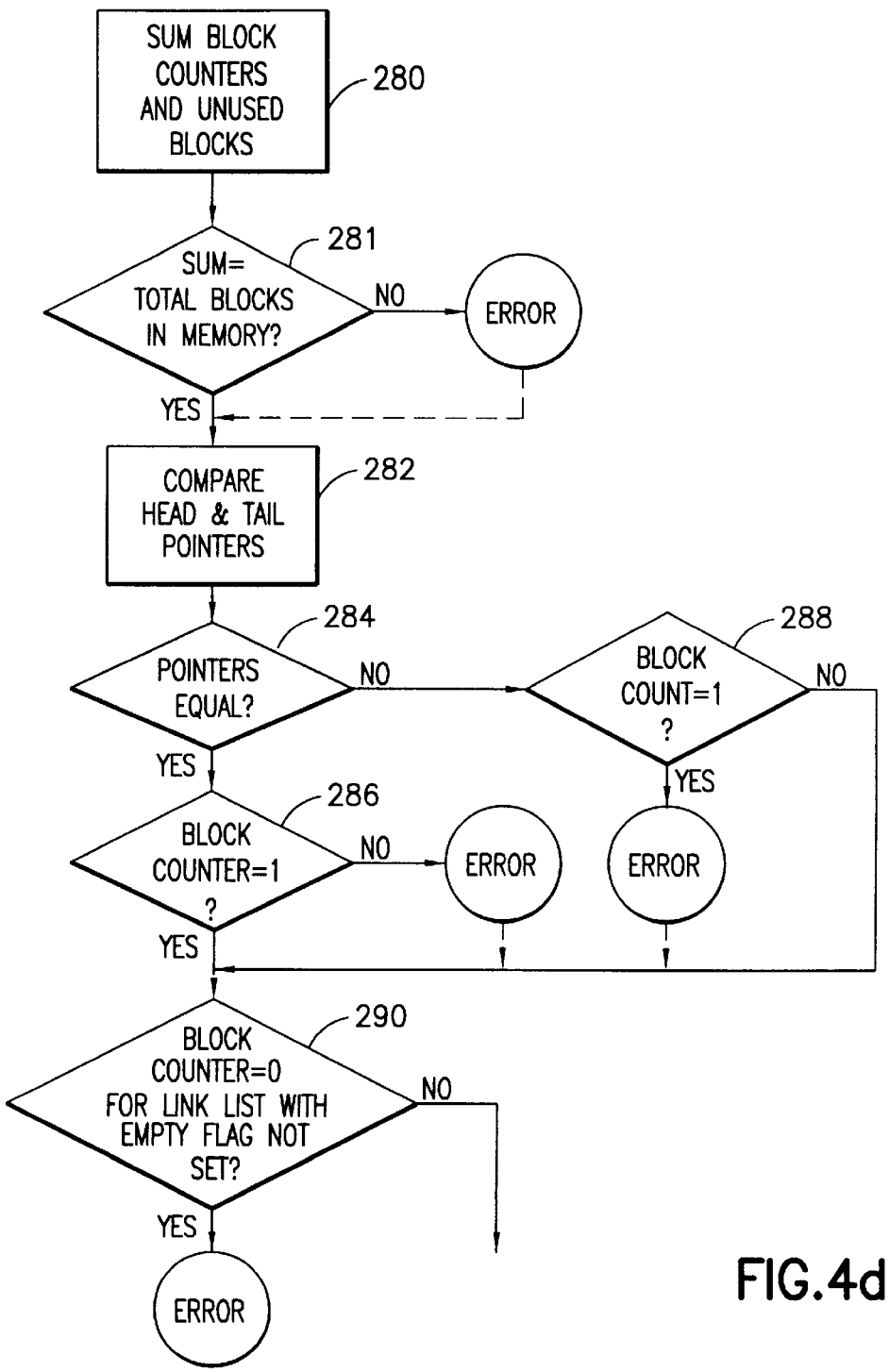

FIG. 4c sets out the operation with respect to the queue clear microprocessor command (received via the microprocessor interface 167). When the queue clear operation is presented, at 270 the queue status for the link list is updated by setting the queue empty flag, and at 272, the blocks in the queue are added to the head of the free list which is updated in a manner discussed above (FIG. 4b) with reference to the cell read operation.

The link list monitoring operation seen in FIG. 4d is the hardware agent which monitors the integrity of the link list structure whenever the cell write, cell read, and queue clear operations are not running. The link list monitoring operation preferably monitors four different error conditions. In particular, at 280, the counts of all of the link list block counters (including the free list) where the queue empty flag for those link lists are not set are summed together with the unused blocks and compared the total number of memory blocks in the common RAM. If the sum does not equal the total number of memory blocks in the common RAM, at 281, an error condition is declared by triggering a microprocessor interrupt bit. At 282, the head and tail block pointers of each link list are compared. If at 284 the head and tail block pointers are determined to be equal, at 286 the block counter is checked, and if not equal to one, at 287 an error condition is declared. If the head and tail block pointers are not equal when compared at 284, at 288 the block counter is checked, and if the block count is equal to one, at 289 an error condition is declared. At 290, the block counter for each link list whose queue empty flag is not set is checked; and if the block counter equals zero, at 291 an error condition is declared.

According to the preferred embodiment of the invention, the write, read, clear, and monitoring operations of the flow controller are carried out in hardware. Attached hereto as Appendices A and B is HDL code which was used to synthesize hardware gates which accomplish the above-described operations by use of a VHDL compiler such as "Design Compiler" which is a tool of Synopsis Corp. of Mountainview, California. Appendix A (cellfifo_ll_ent.vhd) is HDL code for establishing input and output port mapping for the block generated by the HDL code of Appendix B (cellfifo_ll_rt1.vhd). Appendix C includes four state machines diagrams corresponding to the HDL code, including a write state machine, a read state machine, a clear state machine, and a monitoring state machine. The gates created using the code may be standard cell technology or gate array technology. It is noted that the parity error calculation which may carried out either as part of the independent agent utilized in the background to monitor the integrity of the link list structure, or as part of the cell read operation is not included in Appendices A or B. However, code for parity checking is easily generated by those skilled in the art.

It should be appreciated that the invention is not intended to be limited to a strictly hardware implementation, but is also intended to apply to memory management utilizing a microprocessor with associated firmware (e.g., a ROM).

There have been described and illustrated herein an apparatus and method for management of shared memory. While particular embodiments of the invention have been described, it is not intended that the invention be limited thereto, as it is intended that the invention be as broad in scope as the art will allow and that the specification be read likewise. Thus, while the invention has been described with reference to VLSI implemented ATM equipment, it will be appreciated that the invention has broader applicability. Also, while specific details of RAM sizes, etc. have been disclosed, it will be appreciated that the details could be varied without deviating from the scope of the invention. For example, while a management of RAM of size x bits by y words has been described for managing y-2 link lists of data, it will be appreciated that the management RAM could assume different sizes. Thus, for example, instead of using a separate word for the unused block pointer, the unused block pointer could be located in the "tail pointer" location of the free list (which itself does not use a tail pointer), thereby providing a management RAM of x bits by y words for managing y-1 link lists of data. In addition, rather than providing the information related to the link lists with the head pointer, tail pointer, block counter, and queue empty flag in that order, the variables of the link list could be reordered. Similarly, instead of providing a shared memory having pages of thirty-two words in depth, each word being sixteen bits in length, it will be appreciated that memories of different lengths and depths could be utilized. Also, rather than locating the pointer to the next block in the last word of the last page of a previous block, it will be appreciated that the pointer could be located in a different location. Further yet, while specific flow charts have been disclosed with respect to various operations, it will be appreciated that various aspects of the operations can be conducted in different orders. In addition, while particular code has been disclosed for generating gate arrays which conduct the operations in hardware, it should be appreciated by those skilled in the art that other code can be utilized to generate hardware, and that hardware and/or firmware can be generated in different manners. Furthermore, while the invention was described with respect to separate RAMs for the management RAM and the shared data RAM, it will be appreciated that both memories may be part of a larger single memory means. It will therefore be appreciated by those skilled in the art that yet other modifications could be made to the provided invention without deviating from its spirit and scope as so claimed.

APPENDIX A cellfifo_11_ent.vhd    Wed Oct 16 14:23:28 1996

```
---- Module:           entity CELLFIFO_11
----
---- Creation Date:    Wed, 30 Aug 1995
```

```vhdl
entity CELLFIFO_11 is generic (
    MAX_NR_QUEUES:       integer:=     24;
    NR_BLOCKS:           integer:=   1024;
    NR_CELLS:            integer:=      4;
    TOTAL_NR_CELLS:      integer:=   4096;
    NR_WORDS:            integer:=     26;
    CELL_SIZE:           integer:=     32;
    NR_DATA_BITS:        integer:=     16;
    NR_ADDR_BITS:        integer:=     17;
    NR_RAM_WORDS:        integer:= 131072;
    NON_RESERVED_LIMIT:  integer:=      6
  );

port (
  ---------------------------------------------------------------
    PushAck:        out boolean;                                    --
    PushReq:        in  boolean;                                    --
    ValidIn:        in  boolean;                                    --
    DataIn:         in  unsigned(NR_DATA_BITS - 1 downto 0);        --
    SocIn:          in  boolean;                                    --
    WriteQueueNr:   in  integer range 0 to MAX_NR_QUEUES-1;         --
  ---------------------------------------------------------------
    Overflow:       out booleans(0 to MAX_NR_QUEUES-1);             --
    OverflowAck:    in  booleans(0 to MAX_NR_QUEUES-1);             --
    ReservedFull:   out booleans(0 to MAX_NR_QUEUES-1);             --
    CellPushed:     out boolean;                                    --
    CellPushedAck:  in  boolean;
  ---------------------------------------------------------------
    DataOut:        out unsigned(NR_DATA_BITS - 1 downto 0);        --
    SocOut:         out boolean;                                    --
    DataValid:      out boolean;                                    --
    DataQueueNr:    out integer range 0 to MAX_NR_QUEUES-1;         --
    PopAck:         out boolean;                                    --
    PopReq:         in  boolean;                                    --
    ReadQueueNr:    in  integer range 0 to MAX_NR_QUEUES-1;         --
    RepeatCell:     in  boolean;                                    --
  ---------------------------------------------------------------
    Underflow:      out booleans(0 to MAX_NR_QUEUES-1);             --
    UnderflowAck:   in  booleans(0 to MAX_NR_QUEUES-1);             --
    Empty:          out booleans(0 to MAX_NR_QUEUES-1);             --
    CellPopped:     out boolean;                                    --
    CellPoppedAck:  in  boolean;
  ---------------------------------------------------------------
    Address:        out unsigned(NR_ADDR_BITS - 1 downto 0);        --
    DataToXRam:     out unsigned(NR_DATA_BITS - 1 downto 0);        --
    DataToXRamEnable: out boolean;                                  --
    DataFromXRam:   in  unsigned(NR_DATA_BITS - 1 downto 0);        --
    CE_N:           out one_bit;                                    --
    WE_N:           out one_bit;                                    --
    OE_N:           out one_bit;
  ---------------------------------------------------------------
    PrtyError:          out boolean;                                --
    CountError:         out boolean;                                --
    NonReservedFlag:    out boolean;                                --
    NonReservedCount:   out integer range 0 to NR_BLOCKS;           --
    TotalReservedBlocks: in integer range 0 to NR_BLOCKS;           --
    ReservedBlocks:     in  T_LIM_INTEGER_LIST (0 to MAX_NR_QUEUES-1);
    ActualNrBlocks:     in  integer range 0 to NR_BLOCKS;           --
    ActualNrQueues:     in  integer range 0 to MAX_NR_QUEUES;       --
    QueueClear:         in  booleans(0 to MAX_NR_QUEUES-1);         --
    QueueWriteEnable:   in  booleans(0 to MAX_NR_QUEUES-1);         --
    TestMode:           in  boolean;                                --
    Clk:                in  one_bit;                                --
    Reset_N:            in  one_bit
  );
end CELLFIFO_11;
```

APPENDIX B

```
cellfifo_11_rtl.vhd       Wed Oct 16 14:19:35 1996

---- Module:           RTL architecture CELLFIFO_11
----
---- Creation Date:    Thu, 18 Jan 1996 architecture RTL of CELLFIFO_11 is signal   IRam_Ready:           boolean;
    signal   Q:                    S_IRAM_DATA;
    signal   IRam_DataFrom:        S_IRAM_DATA;
    signal   IRam_DataTo:          S_IRAM_DATA;
    signal   IRam_Address:         S_IRAM_ADDR;
    signal   IRam_ReadEnable:      boolean;
    signal   IRam_WriteEnable:     boolean;

signal   WE_Negedge:           one_bit;
    signal   WE_Posedge:           one_bit;
    signal   OE_Negedge:           one_bit;
    signal   OE_Posedge:           one_bit;

signal   WriteEnable:          boolean;
    signal   OutputEnable:         boolean;
    signal   CellIsPopped:         boolean;
    signal   QueuesEmpty:          booleans (0 to MAX_NR_QUEUES-1);
    signal   QReserveFull:         booleans (0 to MAX_NR_QUEUES-1);

signal   NonReservedBlockCount: S_BLOCK_CNT;
    signal   InitialCondition:     boolean;
    signal   NextIsNotYetUsed:     boolean;

begin

IRam_DataFrom      <= IRam_DataTo  when TestMode else
                          Q;

CellPopped         <= CellIsPopped;

Empty              <= QueuesEmpty;

ReservedFull       <= QReserveFull;

NonReservedCount   <= NonReservedBlockCount;

MAIN: process (Clk, Reset_N)

variable ClearState:       T_CLEAR_STATE;
        variable WriteState:       T_WRITE_STATE;
        variable ReadState:        T_READ_STATE;
        variable PopReqState:      T_POPREQ_STATE;
        variable MonitorState:     T_MONITOR_STATE;
```

APPENDIX B-PAGE 2

```
variable ChHeadPtr:              T_POINTER;
variable ChTailPtr:              T_POINTER;
variable ChNrBlocksInQueue:      S_BLOCK_CNT;
variable ChLastBlockNr:          S_BLOCK_NR;
variable CheckQueueNr:           S_QUEUE_NR;
variable QueuesToClear:          booleans (0 to MAX_NR_QUEUES-1);

variable WrQueueNr:              S_QUEUE_NR;
variable WrBlockNr:              S_BLOCK_NR;
variable WrCellNr:               S_CELL_NR;
variable WrWordNr:               S_EXT_WORD_NR;
variable WrHeadPtr:              T_POINTER;
variable WrTailPtr:              T_POINTER;
variable WrNrBlocksInQueue:      S_BLOCK_CNT;

variable FirstBlock:             boolean;
variable ResFull:                boolean;
variable Failed:                 boolean;
variable WritingInExistingBlock: boolean;
variable WrPrtyErr:              boolean;

variable RdHeadPtr:              T_POINTER;
variable OldHeadPtr:             T_POINTER;
variable RdTailPtr:              T_POINTER;
variable RdNrBlocksInQueue:      S_BLOCK_CNT;
variable RdQueueNr:              S_QUEUE_NR;
variable RdBlockNr:              S_BLOCK_NR;
variable RdCellNr:               S_CELL_NR;
variable RdWordNr:               S_EXT_WORD_NR;

variable RemovedBlock:           boolean;
variable ResOverFull:            boolean;

variable MonQueueNr:             S_QUEUE_NR;
variable MonHeadPtr:             T_POINTER;
variable MonTailPtr:             T_POINTER;
variable MonNrBlocksInQueue:     S_BLOCK_CNT;
variable NoMonitoringAllowed:    boolean;
variable CheckSum:               S_BLOCK_CNT;

variable DontTouchFreeList:      boolean;
variable FreeListWasEmpty:       boolean;
variable Head_FREE_LIST:         S_BLOCK_NR;
variable Cnt_FREE_LIST:          S_BLOCK_CNT;
variable NewHead_FreeList:       S_BLOCK_NR;
variable OldHead_FreeList:       S_BLOCK_NR;
variable PrevHead_FreeList:      S_BLOCK_NR;
variable NotYetUsed:             S_BLOCK_NR;
variable NextFree:               S_BLOCK_NR;
variable LastBlockNr:            S_BLOCK_CNT;

variable DeltaNonReserved:       S_BLOCK_CNT;
variable IncNonReservedCount:    boolean;
variable DecNonReservedCount:    boolean;

variable NextBlock:              S_BLOCK_NR;
variable RdPrtyErr:              boolean;
variable PoppedQueueNr:          S_QUEUE_NR;
variable CellPoppedOut:          boolean;
variable PopReq_Acknowledge:     boolean;
variable GetQInfo:               boolean;
```

APPENDIX B-PAGE 3

```
variable IRamBusy:              boolean;
variable XRamBusy:              boolean;
variable DataReg:               unsigned (NR_DATA_BITS - 1 downto 0);

variable XRam_Address:          unsigned (NR_ADDR_BITS - 1 downto 0);
variable LastCellInQueue:       boolean;
variable CountErr:              boolean;

begin if (Reset_N = ACTIVE_LOW) then

PushAck                 <= FALSE;
        Overflow                <= (others => FALSE);

CellPushed              <= FALSE;
        DataOut                 <= (others => LOW);
        SocOut                  <= FALSE;
        DataValid               <= FALSE;
        DataQueueNr             <= 0;
        PopAck                  <= FALSE;
        UnderFlow               <= (others => FALSE);

QReserveFull            <= (others => FALSE);
        QueuesEmpty             <= (others => TRUE);
        InitialCondition        <= TRUE;
        DataReg                 := (others => '0');

WriteState              := WAIT_FOR_SOC;
        WrQueueNr               := 0;
        WrBlockNr               := 0;
        WrCellNr                := 0;
        WrWordNr                := 0;
        WrHeadPtr.BLOCK_NR      := 0;
        WrHeadPtr.CELL_NR       := 0;
        WrTailPtr.BLOCK_NR      := 0;
        WrTailPtr.CELL_NR       := 0;
        WrNrBlocksInQueue       := 0;
        FirstBlock              := FALSE;
        WritingInExistingBlock  := FALSE;
        ResFull                 := FALSE;

ReadState               := WAIT_FOR_FIRST_POP;
        RdQueueNr               := 0;
        RdBlockNr               := 0;
        RdCellNr                := 0;
        RdWordNr                := 0;
        RdTailPtr.BLOCK_NR      := 0;
        RdTailPtr.CELL_NR       := 0;
        RdNrBlocksInQueue       := 0;
        RemovedBlock            := FALSE;
        ResOverFull             := FALSE;

ClearState              := WAIT_FOR_QUEUE_TO_CLEAR;
        CheckQueueNr            := 0;
        ChLastBlockNr           := 0;
        ChNrBlocksInQueue       := 0;
        QueuesToClear           := (others => FALSE);
```

APPENDIX B-PAGE 4

```
MonitorState            := INITIAL;
CheckSum                := 0;
MonQueueNr              := 0;

PopReqState             := WAIT_FOR_POP_REQ;
CellIsPopped            <= FALSE;
PopReq_Acknowledge      := FALSE;
PoppedQueueNr           := 0;
CellPoppedOut           := FALSE;

PrtyError               <= FALSE;
CountError              <= FALSE;
NonReservedBlockCount   <= 0;
NonReservedFlag         <= FALSE;

Address                 <= (others => '0');
DataToXRam              <= (others => '0');
WriteEnable             <= FALSE;
OutputEnable            <= FALSE;

Cnt_FREE_LIST           := 0;
Head_FREE_LIST          := 0;
NotYetUsed              := 0;
NextIsNotYetUsed        <= FALSE;
NewHead_FreeList        := 0;
OldHead_FreeList        := 0;
PrevHead_FreeList       := 0;
NextBlock               := 0;

IRamBusy                := FALSE;
IRam_Address            <= (others => LOW);
IRam_DataTo             <= (others => LOW);
IRam_ReadEnable         <= FALSE;
IRam_WriteEnable        <= FALSE;

elsif (Clk'event and Clk='1') then

LastBlockNr           := ActualNrBlocks - 1;

if ( InitialCondition ) then
    Cnt_FREE_LIST       := ActualNrBlocks;
    for i in 0 to MAX_NR_QUEUES - 1 loop
       QReserveFull (i) <= (ReservedBlocks(i) = 0);
    end loop;
  end if;

for i in 0 to MAX_NR_QUEUES - 1 loop
    if OverflowAck(i) then
       Overflow(i)      <= FALSE;
    end if;
    if UnderflowAck(i) then
       Underflow(i)     <= FALSE;
    end if;
    if QueueClear(i) and (not QueuesEmpty(i)) then
       QueuesToClear(i) := TRUE;
    end if;
  end loop;
  if CellPushedAck then
    CellPushed          <= FALSE;
  end if;
  if CellPoppedAck then
    CellIsPopped        <= FALSE;
  end if;
```

APPENDIX B-PAGE 5

```
WrPrtyErr              := FALSE;
RdPrtyErr              := FALSE;
CountErr               := FALSE;
XRamBusy               := FALSE;
DeltaNonReserved       := 0;
IncNonReservedCount    := FALSE;
DecNonReservedCount    := FALSE;
DontTouchFreeList      := FALSE;
NoMonitoringAllowed    := FALSE;

PushAck                <= TRUE;
WriteEnable            <= FALSE;
OutputEnable           <= FALSE;
IRam_ReadEnable        <= FALSE;
IRam_WriteEnable       <= FALSE;

case WriteState is when WAIT_FOR_SOC => if PushReq and ValidIn and SocIn
              and QueueWriteEnable (WriteQueueNr) then PushAck                  <= FALSE;
      WrQueueNr                := WriteQueueNr;
      WrWordNr                 := 0;
      DataReg                  := DataIn;
      FirstBlock               := FALSE;
      WriteState               := WAIT_FOR_IRAM_NOT_BUSY;

if QueuesToClear (WrQueueNr) then
        WriteState             := WAIT_ON_CLEAR_READY;

elsif QueuesEmpty (WrQueueNr) then
        FirstBlock             := TRUE;
        ResFull                := (ReservedBlocks (WrQueueNr) = 0);
        WriteState             := ALLOCATE_NEW_BLOCK;
      end if;

end if;   -- PushReq and ValidIn and SocIn when WAIT_ON_CLEAR_READY =>

PushAck                  <= FALSE;

if ( not QueuesToClear (WrQueueNr) ) then
      FirstBlock             := TRUE;
      ResFull                := (ReservedBlocks (WrQueueNr) = 0);
      WriteState             := ALLOCATE_NEW_BLOCK;
    end if;                          -- Clear ready
```

APPENDIX B-PAGE 6

```
when WAIT_FOR_IRAM_NOT_BUSY =>

PushAck                        <= FALSE;

if ( QueuesToClear (WrQueueNr) ) then
    WriteState                   := WAIT_FOR_SOC;
  elsif (not IRamBusy) then
    WritingInExistingBlock       := FALSE;
    ReadQInfoFromIRam (WrQueueNr);
    WriteState                   := GET_QUEUE_STATUS;
  end if;

when ALLOCATE_NEW_BLOCK =>

PushAck                        <= FALSE;
  DontTouchFreeList              := TRUE;
  NoMonitoringAllowed            := TRUE;

WrCellNr                       := 0;
  AllocateNewBlock (ResFull, Failed, WrBlockNr);

if Failed then                        -- no block was allocated
    Overflow (WrQueueNr)         <= TRUE;
    if (not FirstBlock) then
      IRamBusy                   := FALSE;
    end if;
    WriteState                   := WAIT_FOR_SOC;

elsif FirstBlock then
    WriteState                   := STORE_FIRST_BLOCK_STATUS;
  else
    WriteState                   := WRITE_QUEUE_INFO;
  end if;

when WRITE_QUEUE_INFO =>

PushAck                        <= FALSE;
  NoMonitoringAllowed            := TRUE;

DontTouchFreeList              := TRUE;
  SetNextBlockNr (WrTailPtr.BLOCK_NR, WrBlockNr);

WrTailPtr.BLOCK_NR             := WrBlockNr;
  WrTailPtr.CELL_NR              := 0;

WrNrBlocksInQueue              := IncSat (WrNrBlocksInQueue, NR_BLOCKS + 1);

WriteQInfoToIRam (WrQueueNr,WrHeadPtr,WrTailPtr,WrNrBlocksInQueue);

WriteState                     := WAIT_ON_IRAM_READY;
```

APPENDIX B-PAGE 7

```
when GET_QUEUE_STATUS =>

PushAck                      <= FALSE;
  NoMonitoringAllowed          := TRUE;

if IRam_Ready then if ( WritingInExistingBlock ) then

IRamBusy                 := FALSE;
      WriteState               := WRITE_FIRST_WORD;

elsif ( QueuesEmpty (WrQueueNr) ) then

IRamBusy                 := FALSE;
      FirstBlock               := TRUE;
      DontTouchFreeList        := TRUE;
      ResFull                  := (ReservedBlocks (WrQueueNr) = 0);
      WriteState               := ALLOCATE_NEW_BLOCK;

else

SplitData (IRam_DataFrom, WrHeadPtr, WrTailPtr, WrNrBlocksInQueue);

WrBlockNr                := WrTailPtr.BLOCK_NR;
      WrCellNr                 := WrTailPtr.CELL_NR;

ResFull         := WrNrBlocksInQueue >= ReservedBlocks(WrQueueNr);

if LastCell(WrCellNr)    then           -- last cell in block

WriteState             := ALLOCATE_NEW_BLOCK;

else

WrCellNr               := IncMod (WrCellNr, NR_CELLS);
        WritingInExistingBlock := TRUE;
        WrTailPtr.CELL_NR      := WrCellNr;

QReserveFull (WrQueueNr) <= ResFull;

WriteQInfoToIRam(WrQueueNr,WrHeadPtr,WrTailPtr,WrNrBlocksInQueue);

end if;                                 -- LastCell(WrCellNr)
    end if;                                   -- WritingInExistingBlock
  end if;                                     -- IRam_Ready
```

APPENDIX B-PAGE 8

```
when STORE_FIRST_BLOCK_STATUS =>

PushAck                       <= FALSE;
   DontTouchFreeList             := TRUE;
   NoMonitoringAllowed           := TRUE;

if (not IRamBusy) then

WrHeadPtr.BLOCK_NR         := WrBlockNr;
      WrHeadPtr.CELL_NR          := WrCellNr;
      WrTailPtr.BLOCK_NR         := WrBlockNr;
      WrTailPtr.CELL_NR          := WrCellNr;
      WrNrBlocksInQueue          := 1;

WriteQInfoToIRam (WrQueueNr,WrHeadPtr,WrTailPtr,WrNrBlocksInQueue);

WriteState                 := WAIT_ON_IRAM_READY;

end if;

when WAIT_ON_IRAM_READY  =>

PushAck                       <= FALSE;
   DontTouchFreeList             := TRUE;
   NoMonitoringAllowed           := TRUE;

if IRam_Ready then

IRamBusy                   := FALSE;
      NextIsNotYetUsed           <= (WrBlockNr = NotYetUsed) and
                                    (WrBlockNr /= LastBlockNr);

WriteState                 := UPDATE_FREE_LIST;

end if;

when UPDATE_FREE_LIST  =>

PushAck                    <= FALSE;
      NoMonitoringAllowed        := TRUE;

DontTouchFreeList          := TRUE;
      WriteState                 := WRITE_FIRST_WORD;

if (Cnt_FREE_LIST > 1) then if ( NextIsNotYetUsed ) then

Head_FREE_LIST       := IncSat (WrBlockNr, NR_BLOCKS);
            NotYetUsed           := Head_FREE_LIST;

else

ReadXRam (WrBlockNr, NR_CELLS-1, NEXT_FIELD_POS);
            WriteState           := FIND_NEXT_FREE_BLOCK;

end if;

end if;
```

APPENDIX B-PAGE 9

```
  Cnt_FREE_LIST                   := DecSat (Cnt_FREE_LIST, 0);

DecNonReservedCount             := QReserveFull (WrQueueNr);

QReserveFull (WrQueueNr)        <=
                (WrNrBlocksInQueue >= ReservedBlocks(WrQueueNr));

when FIND_NEXT_FREE_BLOCK =>

PushAck                         <= FALSE;

SetNextBlockNr (WrBlockNr, conv_integer (LAST_BLOCK_CODE));

WrPrtyErr  := CheckOddParity (DataFromXRam);
  NextFree   := conv_integer (DataFromXRam(BLOCK_NR_WIDTH-1 downto 0));

Head_FREE_LIST                  := NextFree;
  WriteState                      := WRITE_FIRST_WORD;

when WRITE_FIRST_WORD => if QueuesToClear(WrQueueNr) or (not QueueWriteEnable(WrQueueNr)) then

WriteState                    := WAIT_FOR_SOC;

else

WriteXRam (WrBlockNr, WrCellNr, WrWordNr, DataReg);
    WrWordNr                      := IncMod (WrWordNr, NR_WORDS);
    WriteState                    := WRITE_CELL;

end if;

when WRITE_CELL => if QueuesToClear(WrQueueNr) or (not QueueWriteEnable(WrQueueNr)) then

WriteState                    := WAIT_FOR_SOC;

elsif PushReq and ValidIn then

WriteXRam (WrBlockNr, WrCellNr, WrWordNr, DataIn);

if LastWord (WrWordNr) then

CellPushed                  <= TRUE;
      WrWordNr                    := 0;
      QueuesEmpty (WrQueueNr)     <= FALSE;
      WriteState                  := WAIT_FOR_SOC;

else

WrWordNr                    := IncMod (WrWordNr, NR_WORDS);

end if;         -- LastWord end if;           -- PushReq and ValidIn
```

APPENDIX B-PAGE 10

```
    end case;

PopAck                  <= FALSE;
DataValid               <= FALSE;
GetQInfo                := FALSE;

case ReadState is when WAIT_FOR_FIRST_POP => if (PopReq)                               then          -- pop first word

RdQueueNr                 := ReadQueueNr;
      PopReq_Acknowledge        := TRUE;
      GetQInfo                  := TRUE;

elsif (PopReqState = CELL_REQUESTED)  then          -- pop first word

RdQueueNr                 := PoppedQueueNr;
      PopReq_Acknowledge        := TRUE;
      GetQInfo                  := TRUE;

end if;

if GetQInfo then if ( QueuesToClear (RdQueueNr) or QueuesEmpty (RdQueueNr) ) then Underflow (RdQueueNr)   <= TRUE;

else

RdWordNr                := 0;
        ReadState               := WAIT_FOR_IRAM_NOT_BUSY;

end if;

end if;
```

APPENDIX B-PAGE 11

```
when WAIT_FOR_IRAM_NOT_BUSY => if ( QueuesToClear (RdQueueNr) ) then

Underflow (RdQueueNr)       <= TRUE;
    ReadState                   := WAIT_FOR_FIRST_POP;

elsif (not IRamBusy) then

ReadQInfoFromIRam (RdQueueNr);
    ReadState                   := GET_QUEUE_STATUS;

end if;

when GET_QUEUE_STATUS => if IRam_Ready then

IRamBusy                    := FALSE;

SplitData (IRam_DataFrom, RdHeadPtr, RdTailPtr, RdNrBlocksInQueue);

RdBlockNr                   := RdHeadPtr.BLOCK_NR;
    RdCellNr                    := RdHeadPtr.CELL_NR;

ReadState                   := WAIT_FOR_XRAM_NOT_BUSY;

end if;                                      -- IRam_Ready when WAIT_FOR_XRAM_NOT_BUSY => if ( QueuesToClear (RdQueueNr) ) then

Underflow (RdQueueNr)       <= TRUE;
    ReadState                   := WAIT_FOR_FIRST_POP;

elsif (not XRamBusy) then

ReadXRam (RdBlockNr, RdCellNr, RdWordNr);
    ReadState                   := READ_CELL;

end if;
```

APPENDIX B-PAGE 12

```
when READ_CELL =>

DataQueueNr                  <= RdQueueNr;
  SocOut                       <= (RdWordNr = 0);
  DataOut                      <= DataFromXRam;

if ( QueueClear (RdQueueNr) ) then

Underflow (RdQueueNr)      <= TRUE;
    ReadState                  := WAIT_FOR_FIRST_POP;

else

PopAck                     <= TRUE;
    DataValid                  <= TRUE;

ReadState                  := WAIT_FOR_NEXT_POP;

if LastWord (RdWordNr) then

RdWordNr                 := 0;

if ( not RepeatCell ) then
        CellIsPopped            <= TRUE;
        ReadState               := WAIT_FOR_IRAM_ACCESS;
      end if;

else

RdWordNr                 := IncMod (RdWordNr, NR_WORDS);

if PopReq then if (not XRamBusy) then
          ReadXRam (RdBlockNr, RdCellNr, RdWordNr);
        else
          ReadState              := WAIT_FOR_XRAM_NOT_BUSY;
        end if;

end if;

end if;

end if;                           -- QueueClear (RdQueueNr)
```

APPENDIX B-PAGE 13

```
when WAIT_FOR_NEXT_POP => if ( QueuesToClear (RdQueueNr) ) then

Underflow (RdQueueNr)        <= TRUE;
      ReadState                    := WAIT_FOR_FIRST_POP;

elsif PopReq then if (not XRamBusy) then
         ReadXRam (RdBlockNr, RdCellNr, RdWordNr);
         ReadState                 := READ_CELL;
      else
         ReadState                 := WAIT_FOR_XRAM_NOT_BUSY;
      end if;

end if;

when WAIT_FOR_IRAM_ACCESS => if ( QueuesToClear (RdQueueNr) ) then

ReadState                    := WAIT_FOR_FIRST_POP;

elsif (not IRamBusy) then

ReadQInfoFromIRam (RdQueueNr);
      ReadState                    := UPDATE_QUEUE_STATUS;

end if;

when UPDATE_QUEUE_STATUS =>

NoMonitoringAllowed             := TRUE;
   RemovedBlock                    := FALSE;

if IRam_Ready then

SplitData (IRam_DataFrom, OldHeadPtr, RdTailPtr, RdNrBlocksInQueue);

LastCellInQueue := (RdBlockNr = RdTailPtr.BLOCK_NR) and
                         (RdCellNr  = RdTailPtr.CELL_NR) and
                         (RdNrBlocksInQueue = 1);

ResOverFull     := (RdNrBlocksInQueue > ReservedBlocks (RdQueueNr));

if ( LastCellInQueue ) then

IRamBusy                  := FALSE;
         QueuesEmpty (RdQueueNr)   <= TRUE;
         RdNrBlocksInQueue         := 0;
         DontTouchFreeList         := TRUE;
         ReadState                 := UPDATE_FREE_LIST;
```

APPENDIX B-PAGE 14

```
elsif ( LastCell (RdCellNr) ) then

RemovedBlock              := TRUE;
   RdNrBlocksInQueue         := DecSat (RdNrBlocksInQueue, 0);
   ReadState                 := GET_NEXT_BLOCK_NR;

else

RdHeadPtr.BLOCK_NR        := RdBlockNr;
   RdHeadPtr.CELL_NR         := IncSat (RdCellNr, NR_CELLS);

WriteQInfoToIRam (RdQueueNr,RdHeadPtr,RdTailPtr,RdNrBlocksInQueue);
   ReadState                 := WAIT_ON_IRAM_READY;

end if;

QReserveFull (RdQueueNr)    <=
              (RdNrBlocksInQueue >= ReservedBlocks (RdQueueNr));

end if;                     -- IRam_Ready when GET_NEXT_BLOCK_NR =>

NoMonitoringAllowed        := TRUE;

if (not XRamBusy) then
    ReadXRam (RdBlockNr, NR_CELLS-1, NEXT_FIELD_POS);
    ReadState                := REMOVE_BLOCK;
  end if;

when REMOVE_BLOCK =>

NoMonitoringAllowed        := TRUE;
  RemovedBlock               := FALSE;

RdPrtyErr                  := CheckOddParity (DataFromXRam);
  NextBlock   := conv_integer (DataFromXRam(BLOCK_NR_WIDTH-1 downto 0));

RdHeadPtr.BLOCK_NR         := NextBlock;
  RdHeadPtr.CELL_NR          := 0;

WriteQInfoToIRam (RdQueueNr,RdHeadPtr,RdTailPtr,RdNrBlocksInQueue);
  ReadState                  := WAIT_FOR_READY_IRAM;

when WAIT_FOR_READY_IRAM =>

NoMonitoringAllowed        := TRUE;

if ( IRam_Ready ) then

IRamBusy                 := FALSE;

if ( QueueClear (RdQueueNr) ) then
      ReadState              := WAIT_FOR_FIRST_POP;
    else
      DontTouchFreeList      := TRUE;
      ReadState              := UPDATE_FREE_LIST;
    end if;

end if;
```

APPENDIX B-PAGE 15

```
when UPDATE_FREE_LIST =>

NoMonitoringAllowed         := TRUE;

if (not DontTouchFreeList) then

DontTouchFreeList         := TRUE;
      FreeListWasEmpty          := (Cnt_FREE_LIST = 0);
      PrevHead_FreeList         := Head_FREE_LIST;

Head_FREE_LIST            := RdBlockNr;
      Cnt_FREE_LIST             := IncSat (Cnt_FREE_LIST, NR_BLOCKS+1);

IncNonReservedCount       := ResOverFull;

ReadState                 := WAIT_FOR_FIRST_POP;

if (not FreeListWasEmpty) then
         ReadState              := SET_NEXT_BLOCK;
      end if;

end if;

when SET_NEXT_BLOCK =>

DontTouchFreeList            := TRUE;

if (not XRamBusy) then
      SetNextBlockNr (RdBlockNr, PrevHead_FreeList);
      ReadState                 := WAIT_FOR_FIRST_POP;
   end if;

when WAIT_ON_IRAM_READY => if IRam_Ready then
      IRamBusy                  := FALSE;
      ReadState                 := WAIT_FOR_FIRST_POP;
   end if;                      -- IRam_Ready end case;
```

APPENDIX B-PAGE 16

```
case ClearState is when WAIT_FOR_QUEUE_TO_CLEAR => if ( or_reduce (conv_active_high (QueuesToClear)) = HIGH ) then

CheckQueueNr    := GetLSBPosition (conv_active_high(QueuesToClear));
      ClearState                  := WAIT_FOR_IRAM_READ_ACCESS;

end if;

when WAIT_FOR_IRAM_READ_ACCESS => if QueuesEmpty (CheckQueueNr) then

QueuesToClear (CheckQueueNr)  := FALSE;
      ClearState                    := WAIT_FOR_QUEUE_TO_CLEAR;

elsif (not DontTouchFreeList) and (not IRamBusy) then

ReadQInfoFromIRam (CheckQueueNr);
      ClearState                    := WAIT_ON_IRAM_READY;

end if;

when WAIT_ON_IRAM_READY => if IRam_Ready then

IRamBusy                  := FALSE;

SplitData (IRam_DataFrom, ChHeadPtr, ChTailPtr, ChNrBlocksInQueue);

NewHead_FreeList          := ChHeadPtr.BLOCK_NR;
      ChLastBlockNr             := ChTailPtr.BLOCK_NR;

ClearState                := UPDATE_FREE_LIST;

end if;
```

APPENDIX B-PAGE 17

```
when UPDATE_FREE_LIST =>

NoMonitoringAllowed              := TRUE;

if (not DontTouchFreeList) then

OldHead_FreeList              := Head_FREE_LIST;

if ( Cnt_FREE_LIST = 0 ) then
         QueuesToClear(CheckQueueNr) := FALSE;
         ClearState                  := WAIT_FOR_QUEUE_TO_CLEAR;
      else
         ClearState                  := SET_NEXT_FIELD;
      end if;

Head_FREE_LIST                 := NewHead_FreeList;
      Cnt_FREE_LIST                  := Cnt_FREE_LIST + ChNrBlocksInQueue;

if (ChNrBlocksInQueue > ReservedBlocks(CheckQueueNr)) then
         DeltaNonReserved            := (ChNrBlocksInQueue -
                                        ReservedBlocks(CheckQueueNr));
      end if;

QueuesEmpty (CheckQueueNr)     <= TRUE;
      QReserveFull (CheckQueueNr)    <= (ReservedBlocks(CheckQueueNr) = 0);

end if;

when SET_NEXT_FIELD =>

NoMonitoringAllowed              := TRUE;

if (not XRamBusy) then

SetNextBlockNr (ChLastBlockNr, OldHead_FreeList);

QueuesToClear(CheckQueueNr)   := FALSE;
      ClearState                    := WAIT_FOR_QUEUE_TO_CLEAR;

end if;

end case;
```

APPENDIX B-PAGE 18

```
case PopReqState is when WAIT_FOR_POP_REQ => if (CellPoppedOut) and (PopReq) then          -- pop first word

PoppedQueueNr            := ReadQueueNr;
      CellPoppedOut            := FALSE;
      PopReqState              := CELL_REQUESTED;

end if;

when CELL_REQUESTED => if ( PopReq_Acknowledge ) then

PopReq_Acknowledge       := FALSE;
      PopReqState              := WAIT_FOR_POP_REQ;

end if;

end case;

if ( CellIsPopped ) then

CellPoppedOut           := TRUE;
  PopReq_Acknowledge      := FALSE;

end if;

NonReservedFlag          <= (NonReservedBlockCount < NON_RESERVED_LIMIT);

if ( InitialCondition ) then

InitialCondition        <= FALSE;
  NonReservedBlockCount   <= ActualNrBlocks - TotalReservedBlocks;

else if IncNonReservedCount then
    NonReservedBlockCount   <= NonReservedBlockCount + 1;

elsif DecNonReservedCount then
    NonReservedBlockCount   <= NonReservedBlockCount - 1;

else
    NonReservedBlockCount   <= NonReservedBlockCount + DeltaNonReserved;
  end if;

end if;
```

APPENDIX B-PAGE 19

```
case MonitorState is when INITIAL =>

MonQueueNr                    := 0;
    CheckSum                      := Cnt_FREE_LIST;

MonitorState                  := MONITORING;

when MONITORING => if ( NoMonitoringAllowed ) then

MonitorState                := INITIAL;

elsif ( not IRamBusy ) then if ( not QueuesEmpty (MonQueueNr) ) then

ReadQInfoFromIRam (MonQueueNr);
        MonitorState              := WAIT_ON_IRAM_READY;

else

MonQueueNr                := IncMod (MonQueueNr, MAX_NR_QUEUES);

if ( (MonQueueNr = 0) or (MonQueueNr = ActualNrQueues) ) then
          CountErr                := (CheckSum /= ActualNrBlocks);
          MonitorState            := INITIAL;
        end if;

end if;

else

MonitorState                := INITIAL;

end if;
```

APPENDIX B-PAGE 20

```
when WAIT_ON_IRAM_READY =>
  if IRam_Ready then
    IRamBusy                      := FALSE;
    if ( NoMonitoringAllowed ) then
      MonitorState                := INITIAL;
    else
      SplitData (IRam_DataFrom,MonHeadPtr,MonTailPtr,MonNrBlocksInQueue);
      CountErr := CheckForCountErr(MonHeadPtr,MonTailPtr,MonNrBlocksInQueue)
+ ;
      CheckSum                    := CheckSum + MonNrBlocksInQueue;
      MonQueueNr                  := IncMod (MonQueueNr, MAX_NR_QUEUES);

if ( (MonQueueNr = 0) or (MonQueueNr = ActualNrQueues) ) then
        CountErr                  := (CheckSum /= ActualNrBlocks);
        MonitorState              := INITIAL;
      else
        MonitorState              := MONITORING;
      end if;
    end if;
  end if;

end case;

PrtyError         <= WrPrtyErr or RdPrtyErr;
  CountError        <= CountErr;

end if; -- Clk-Reset end process MAIN;
```

APPENDIX B-PAGE 21

```
NEG_EDGE: process (Clk, Reset_N)

begin if (Reset_N = ACTIVE_LOW) then

WE_Negedge    <= LOW;
    OE_Negedge    <= LOW;

elsif (Clk'event and Clk='0') then if (WriteEnable) then
      WE_Negedge    <= MakeEvent (WE_Negedge);
    end if;

if (OutputEnable) then
      OE_Negedge    <= MakeEvent (OE_Negedge);
    end if;

end if;

end process NEG_EDGE;

POS_EDGE: process (Clk, Reset_N)

begin if (Reset_N = ACTIVE_LOW) then

WE_Posedge    <= LOW;
    OE_Posedge    <= LOW;

elsif (Clk'event and Clk='1') then

WE_Posedge    <= WE_Negedge;
    OE_Posedge    <= OE_Negedge;

end if;

end process POS_EDGE;

WE_N              <= xnor (WE_Negedge, WE_Posedge);

OE_N              <= xnor (OE_Negedge, OE_Posedge);

CE_N              <= ACTIVE_LOW;

DataToXRamEnable  <= conv_active_low (xnor (WE_Negedge, WE_Posedge));

end RTL;
```

We claim:

1. Apparatus for managing the storage of data in a memory, comprising:
   a) a shared memory means having a plurality of data storage locations;
   b) control means for receiving said data and forwarding said data to desired of said plurality of data storage locations in said shared memory means, wherein said data is stored in said plurality of data storage locations in the form of a plurality of link lists, each link list having a head;
   c) management memory means for storing information regarding each of said plurality of link lists, said information including a head pointer and a queue empty flag for each link list, said head pointer for each particular respective link list pointing to a location of a respective said head of that particular link list, and said queue empty flag for a link list indicating that that link list has no valid data contained therein.

2. An apparatus according to claim 1, wherein:
   said control means reads data from said shared memory means,
   at least a plurality of said data storage locations are in the form of a free link list, said free link list relating to data storage locations from which data has been read by said control means, and
   said management memory means includes a pointer and a queue empty flag for said free link list.

3. An apparatus according to claim 1, wherein:
   upon initialization, at least a plurality of said data storage locations of said shared memory means are unused, and
   said management memory means includes a pointer to at least one of said unused data storage locations.

4. An apparatus according to claim 2, wherein:
   at least a plurality of said data storage locations of said shared memory means are unused, and
   said management memory means includes a pointer to said at least one of said unused data storage locations.

5. An apparatus according to claim 1, wherein:
   said shared memory means is arranged in a plurality of blocks with each block having a plurality of said data storage locations, and
   said information stored in said management memory means regarding each of said plurality of link list queues includes a block counter for each of said plurality of link list queues, each block counter counting the number of blocks contained in that link list queue.

6. An apparatus according to claim 5, wherein:
   each of said plurality of blocks is arranged as a plurality of contiguous pages with each page having a plurality of said data storage locations, and
   each said head pointer comprises a block pointer which points to a block and a page counter which points to a page in said block.

7. An apparatus according to claim 5, wherein:
   each block storing data includes at least one location containing one of (i) a pointer to a next block in the link list, and (ii) an indicator which indicates that the block is the last block in the link list.

8. An apparatus according to claim 7, wherein:
   said pointer to a next block in the link list includes a parity bit for said pointer.

9. An apparatus according to claim 6, wherein:
   each block storing data includes at least one location in a last page of that block containing one of (i) a pointer to a next block in the link list, and (ii) an indicator which indicates that the block is the last block in the link list.

10. An apparatus according to claim 1, wherein:
    said information includes a tail pointer for each link list containing said data.

11. An apparatus according to claim 5, wherein:
    said information includes a tail pointer for each link list containing said data.

12. An apparatus according to claim 6, wherein:
    said information includes a tail pointer for each link list containing said data,
    each of said plurality of blocks is arranged as a plurality of contiguous pages with each page having a plurality of said data storage locations,
    each said head pointer comprises a first block pointer which points to a block and a page counter which points to a page in said block, and
    each said tail pointer comprises a second block pointer which points to a tail block and a page counter which points to a page in said tail block.

13. An apparatus according to claim 6, wherein:
    said data comprises ATM data received in cell format, and each said page includes enough of said data storage locations to store all of the data contained in an ATM cell.

14. An apparatus according to claim 13, wherein:
    each page includes thirty-two sixteen bit word locations.

15. An apparatus according to claim 5, wherein:
    said control means reads data from said shared memory means,
    at least a plurality of said data storage locations are in the form of a free link list, said free link list relating to data storage locations from which data has been read by said control means, and
    said management memory means includes a pointer, a block counter, and a queue empty flag for said free link list,
    at least a plurality of said data storage locations of said shared memory means are unused, and
    said management memory means includes a pointer to said at least one of said unused data storage locations, and
    said control means includes means for comparing a sum of counts of said block counters of each link list containing data, said free link list, and said unused pointer to the number of blocks in said shared memory means.

16. An apparatus according to claim 15, wherein:
    said control means further comprises means for generating an error signal if said sum of counts does not equal said number of blocks in said shared memory means.

17. An apparatus according to claim 11, wherein:
    said control means includes means for comparing, for each link list containing data, said tail pointer to said head pointer.

18. An apparatus according to claim 17, wherein:
    said control means further comprises means for generating an error signal if said tail pointer and said head pointer for a link list containing data point to an identical block, and said block counter for said link list does not equal one.

19. An apparatus according to claim 17, wherein:

said control means further comprises means for generating an error signal if said tail pointer and said head pointer for a link list containing data point to different blocks, and said block counter for said link list equals one.

20. An apparatus according to claim 5, wherein:

said control means further comprises means for checking the count of each block counter of a link list where the queue empty flag is not set, and for generating an error signal if the count is zero and the queue empty flag is not set.

21. An apparatus according to claim 1, wherein:

said control means and said management memory means are contained on a single integrated circuit.

22. An apparatus for managing the storage of data in a memory, comprising:

a) a shared memory means having a plurality of data storage locations;

b) control means for receiving said data and forwarding said data to desired of said plurality of data storage locations in said shared memory means, and for reading data from said shared memory means, wherein said data is stored in said plurality of data storage locations in the form of a plurality of link lists, each link list having a head;

c) management memory means for storing information regarding each of said plurality of link lists, said information including a head pointer for each link list queue, said head pointer for each particular respective link list pointing to a location of a respective said head of that particular link list, wherein upon initialization, at least a plurality of said data storage locations of said shared memory means are unused, and after utilization, at least a plurality of said data storage locations are in the form of a free link list, said free link list relating to data storage locations from which data has been read by said control means, and wherein said management memory means includes a pointer to at least one of said unused data storage locations, and said management memory means includes a pointer for said free link list.

23. An apparatus according to claim 22, wherein:

said information further includes a queue empty flag for each link list, said queue empty flag for a link list indicating that that link list has no valid data contained therein.

24. An apparatus according to claim 22, wherein:

said shared memory means is arranged in a plurality of blocks with each block having a plurality of said data storage locations, and said information stored in said management memory means regarding each of said plurality of link list queues includes a block counter for each of said plurality of link list queues, each block counter counting the number of blocks contained in that link list queue.

25. An apparatus according to claim 24, wherein:

each of said plurality of blocks is arranged as a plurality of contiguous pages with each page having a plurality of said data storage locations, and each said head pointer comprises a block pointer which points to a block and a page counter which points to a page in said block.

26. An apparatus according to claim 24, wherein:

each block storing data includes at least one location containing one of (i) a pointer to a next block in the link list, and (ii) an indicator which indicates that the block is the last block in the link list.

27. An apparatus according to claim 26, wherein:

said pointer to a next block in the link list includes a parity bit for said pointer.

28. An apparatus according to claim 22, wherein:

said information includes a tail pointer for each link list containing said data.

29. An apparatus according to claim 25, wherein:

said data comprises ATM data received in cell format, and each said page includes enough of said data storage locations to store all of the data contained in an ATM cell.

30. An apparatus according to claim 24, wherein:

said management memory means includes said pointer, a block counter, and a queue empty flag for said free link list, and said control means includes means for comparing a sum of counts of said block counters of each link list containing data, said free link list, and said unused pointer to the number of blocks in said shared memory means, and means for generating an error signal is said sum of counts does not equal said number of blocks in said shared memory means.

31. An apparatus according to claim 28, wherein:

said control means includes means for comparing, for each link list containing data, said tails pointer to said head pointer, and means for generating an error signal if either
(i) said tail pointer and said head pointer for a link list containing data point to an identical block, and said block counter for said link list does not equal one, or
(ii) said tail pointer and said head pointer for a link list containing data point to different blocks, and said block counter for said link list equals one.

32. An apparatus according to claim 23, wherein:

said control means further comprises means for checking the count of each block counter of a link list where the queue empty flag is not set, and for generating an error signal if the count is zero and the queue empty flag is not set.

33. A method of managing the storage of data utilizing a controller, a shared memory having a plurality of data storage locations, and a management memory, said method comprising:

a) using said controller to forward received data to desired of the plurality of data storage locations in the shared memory, wherein the data is stored in the plurality of data storage locations in the form of a plurality of link lists, each link list having a head; and b) storing information regarding each of the plurality of link lists in the management memory, said information including a head pointer and a queue empty flag for each link list, said head pointer for each particular respective link list pointing to a location of a respective said head of that particular link list, and said queue empty flag for a link list indicating that that link list has no valid data contained therein.

* * * * *